(12) United States Patent
Paulzagade et al.

(10) Patent No.: US 11,409,604 B1
(45) Date of Patent: Aug. 9, 2022

(54) STORAGE OPTIMIZATION OF PRE-ALLOCATED UNITS OF STORAGE

(71) Applicant: Veritas Technologies LLC, Mountain View, CA (US)

(72) Inventors: Sudhakar Paulzagade, Maharashtra (IN); Chirag Dalal, Aundh (IN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 1069 days.

(21) Appl. No.: 16/028,615

(22) Filed: Jul. 6, 2018

Related U.S. Application Data

(63) Continuation of application No. 14/609,711, filed on Jan. 30, 2015, now Pat. No. 10,019,318.

(51) Int. Cl.
*G06F 16/00* (2019.01)
*G06F 11/14* (2006.01)
*G06F 16/188* (2019.01)

(52) U.S. Cl.
CPC ........ *G06F 11/1402* (2013.01); *G06F 16/188* (2019.01)

(58) Field of Classification Search
CPC ...................................................... G06F 16/188
USPC ........................................................ 707/640
See application file for complete search history.

(56) References Cited

U.S. PATENT DOCUMENTS

| | | | | |
|---|---|---|---|---|
| 6,665,779 B1 * | 12/2003 | Polfer | ................. | G06F 11/1451 714/E11.123 |
| 6,832,330 B1 * | 12/2004 | Boudrie | ............. | G06F 11/1469 714/E11.122 |
| 8,346,727 B1 * | 1/2013 | Chester | ................. | G06F 16/188 707/649 |
| 2015/0134903 A1 * | 5/2015 | Goodman | ............. | G06F 3/0689 711/114 |

* cited by examiner

*Primary Examiner* — Chelcie L Daye

(57) ABSTRACT

Disclosed herein are systems, methods, and processes to optimize the storage of pre-allocated units of storage during a backup operation. Null units of storage are identified in pre-allocated units of storage prior to the backup operation. Upon being identified, the null units of storage are inhibited from being written to a backup image during the backup operation.

20 Claims, 11 Drawing Sheets

400

| Map File 110 | | | | | |
|---|---|---|---|---|---|
| Null Blocks 70(1)-(N) | Block Type 310 | File Type 320 | Header Checksum 350 | Tail Checksum 360 | Offset 410 |
| 70(1) | 0 | A2 | 41 F3 | 01 00 00 00 | 0k – 4k |
| 70(2) | 0 | B3 | 25 E2 | 00 01 00 00 | 8k – 16k |
| 70(3) | 0 | C1 | 76 M3 | 00 00 01 00 | 16k – 20k |
| ⋮ | ⋮ | ⋮ | ⋮ | ⋮ | ⋮ |
| 70(N) | 0 | D4 | 31 P2 | 00 00 00 01 | 24k – 32k |

| Backup Image 120 | | | | | | |
|---|---|---|---|---|---|---|
| Backup File 55(1) | Map File 110(1) | Backup File 55(2) | Map File 110(1) | • • • | Backup File 55(N) | Map File 110(N) |

*FIG. 5*

STORAGE OPTIMIZATION OF PRE-ALLOCATED UNITS OF STORAGE

CROSS-REFERENCE TO RELATED APPLICATIONS

The present patent application is a continuation of U.S. patent application Ser. No. 14/609,711, filed on Jan. 30, 2015, and now issued as U.S. Pat. No. 10,019,318, entitled "Storage Optimization of Pre-Allocated Units of Storage," which is incorporated by reference herein in its entirety and for all purposes as if completely and fully set forth herein.

BACKGROUND OF THE INVENTION

Field of the Invention

This invention relates to data backup operations and, more particularly, to optimizing the storage of pre-allocated units of storage during a data backup operation.

Description of the Related Art

A unit of storage (e.g., a data block) can be pre-allocated or "thick" provisioned. Pre-allocation (also called thick provisioning) pre-allocates storage rather than allocating storage on an as-needed basis. Therefore, thick provisioning is a type of storage allocation in which the amount of storage capacity can be pre-allocated in physical storage. For example, when a database is newly created, data files associated with the database application can be pre-allocated in physical storage. Typically, the pre-allocation of disk space in physical storage is performed by a system administrator based on the expected storage requirements of the computing environment in which the given application or other software program operates (e.g., based on the expected number of active users, the anticipated internet traffic, etc.).

However, when storage capacity in physical storage is pre-allocated, a substantial portion of the units of storage of the data files thus created, based on the pre-allocation, are generally "empty" (contain no data). For example, when the database application creates the data file, the database application pre-allocates storage space on the disk and fills the unused data blocks with a value indicating that such data blocks are unused (or makes such an indication in some other manner). Subsequently, when a backup operation is performed, the data files, with a substantial portion thereof being unused units of storage, are also backed up (e.g., written to a backup image).

SUMMARY OF THE INVENTION

Various systems, methods, and processes for optimizing the storage of pre-allocated units of storage during a backup operation are disclosed. One such method involves identifying one or more null units of storage in pre-allocated units of storage. The pre-allocated units of storage include the one or more null units of storage. The identifying is performed prior to a backup operation, and the backup operation produces a backup image. The method then inhibits the writing of the one or more null units of storage to the backup image during the backup operation.

In some embodiments, the method includes selecting a unit of storage of multiple units of storage. The units of storage are included in a pre-allocated unit of storage of the pre-allocated units of storage. The method determines whether the unit of storage includes null data or live data. In response to the unit of including null data, the method writes only null data unit of storage information, and inhibits writing of the null data. However, in response to the unit of storage including live data, the method writes the live data and also writes live data unit of storage information.

In other embodiments, the method involves creating a map file. The map file includes metadata that identifies the one or more null units of storage not written to the backup image during the backup operation. The method writes the map file along with the one or more live units of storage to the backup image during the backup operation.

In one embodiment, the method generates the one or more null units of storage in response to a request to access data in the pre-allocated unit of storage by accessing the metadata in the map file. In this example, the request to access data in the pre-allocated unit of storage is associated with a restore operation or an instant recovery operation.

In another embodiment, the method merges the one of more null units of storage with the one or more live units of storage in response to the request to access data in the pre-allocated unit of storage. In this example, the one or more null units of storage are generated from the metadata in the map file, and the one or more live units of storage are retrieved from the backup image.

In some embodiments, the null data not written to the backup image and the live data written to the backup image, together make up the data contents of the pre-allocated unit of storage. In other embodiments, the live data, the live data unit of storage information, and the null data unit of storage information are written to the backup image, and the backup image is stored on a storage device associated with a computing system.

In one embodiment, the method involves transmitting the generated one or more null units of storage merged with the one or more live units of storage retrieved from the backup image to an application in response to the request to access data in the pre-allocated unit of storage.

In another embodiment, the one or more null units of storage each include a header and a tail, and information in the header and the tail is stored in the map file. The header of the one or more null units of storage further includes metadata identifying a block type, metadata identifying a file type, a data block address in the header, and a checksum in the header. The tail of the one or more null units of storage includes metadata identifying a data block address in the tail and a checksum in the tail.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present invention, as defined solely by the claims, will become apparent in the non-limiting detailed description set forth below.

BRIEF DESCRIPTION OF THE DRAWINGS

FIG. 4 is a table that illustrates a map file associated with one or more null units of storage, according to one embodiment of the present invention.

FIG. 5 is a table that illustrates a backup image, according to one embodiment of the present invention.

Figure 1:
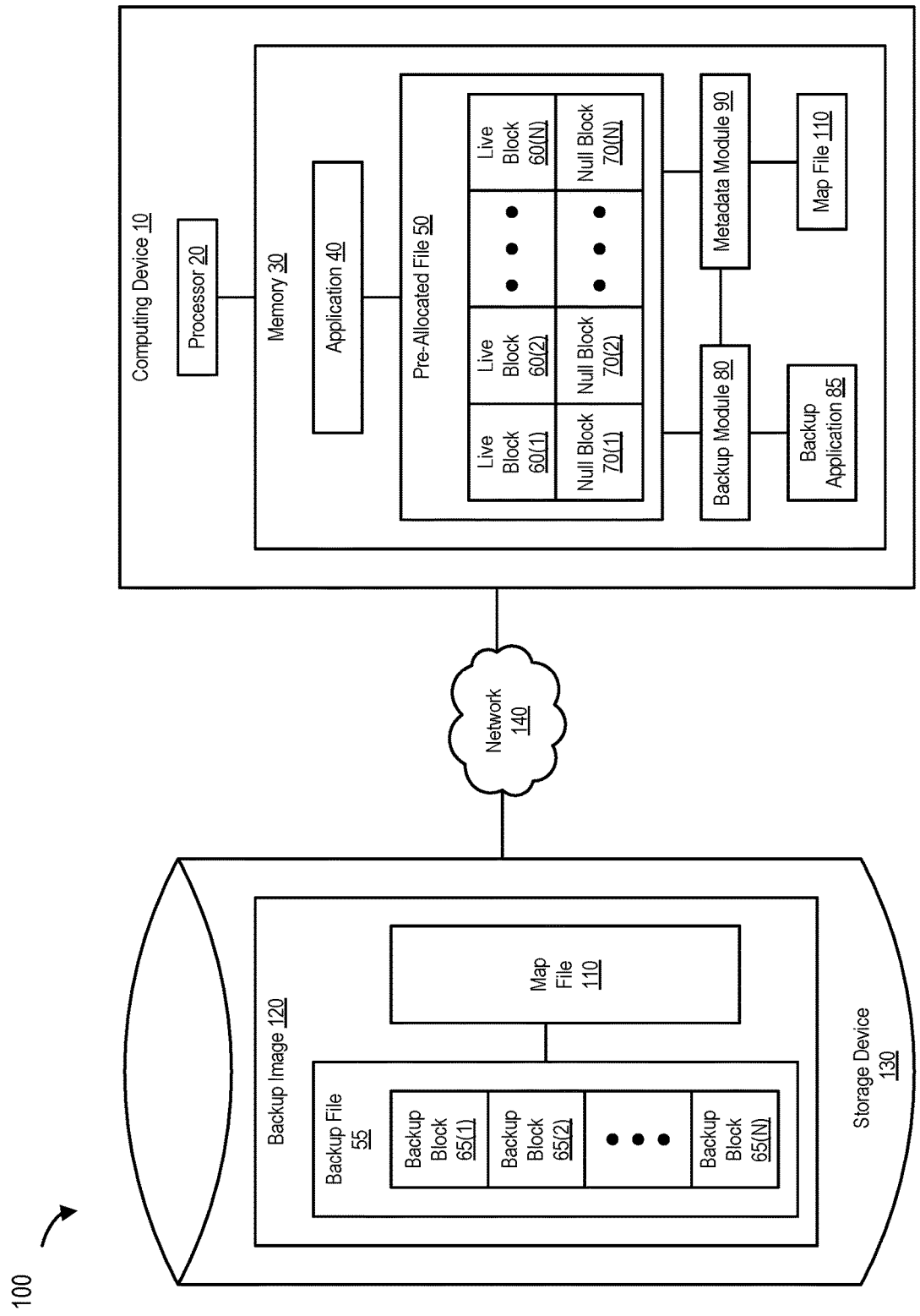
FIG. 1 is a block diagram of a computing system that optimizes the storage of pre-allocated units of storage during a backup operation, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Introduction

Thick provisioning (also referred to herein as pre-allocation) pre-allocates storage capacity based on an expected need, rather than allocating storage capacity on an as-needed basis. Both physical and virtual storage methodologies can be thick provisioned. In the case of pre-allocation involving physical storage, storage space is pre-allocated on a physical storage device (e.g., a hard disk drive (HDD)). In virtual storage, thick provisioning is a type of storage allocation in which the amount of storage capacity on a disk (e.g., a virtual disk) is pre-allocated on physical storage (e.g., on a HDD) at the time the logical storage is created. For example, although thick provisioning can ensure that a virtual machine does not accidentally run out of available storage, creating a 100 gigabyte (GB) virtual disk actually consumes 100 GB of physical disk space. Consequently, 100 GB of physical storage is unavailable, even if no data has been written to the disk.

Some database applications pre-allocate data files when a new database is created. As noted above, the pre-allocation of disk space on physical storage is typically performed by a system and/or database administrator based on the storage requirements of the computing environment in which the database operates and/or is implemented (e.g., based on the expected number of active users, the anticipated internet traffic, among other factors). Therefore, when a database or other storage allocation (e.g., a file) is newly-created, a significant amount of pre-allocated storage therein can be unused (e.g., even accounting for metadata and/or a dictionary information associated with the database, the data files can be 80-85% unused).

For example, in the context of a database, when a database application creates a data file, the database application allocates storage space for the data, and further fills unused units of storage (e.g., blocks, extents, or the like) with predefined values (e.g., null data values), which overwrite whatever (possibly random) values are contained therein, such that these blocks (also referred to herein as null data blocks, or more simply, null blocks) are in a known state (though, in the alternative, metadata associated therewith can be designed to indicate that such blocks contain "null data"). Further, when such "null data" is backed up during a backup operation (e.g., using an image copy and/or proxy copy method), the database application makes a copy of the entire data file and writes the data file to a backup image (e.g., on a backup server). As a result, the backed up data file contains a significant amount of null units of storage which have to restored even though they do not contain any data. As will be appreciated, writing null units of storage, first to a backup image, and then restoring the null units of storage during a restore operation is cumbersome, redundant, needlessly consumes expensive storage resources, and further, consumes substantial memory and computing resources.

One alternative to address the above concern can involve compressing null blocks before writing the null blocks to a backup image. However, null block compression has at least two shortcomings First, null block compression may only be implemented in the case of incremental backup operations. Null block compression may not be implementable when a backup operation is performed using image copy and/or proxy copy methodologies (which have the added benefit of providing instant recovery and copy data management capabilities). Second, null block compression still consumes storage resources and expends memory and computing resources because the compressed null block, however small, is still written to the backup image during a backup operation (thus consuming storage resources), and has to be restored during a restore operation (thus expending memory and computing resources).

Another alternative to address the above concern can involve removing the null block. However, existing deduplication systems can only remove the null block when the null block is encountered for a second time. When an existing deduplication system encounters a null block for the first time, the existing deduplication system writes the null bock to storage. Moreover, there are significant computing costs (e.g., central processing unit (CPU) costs) involved because the null block has to be fingerprinted (e.g., the null block checksum has to be computed every time). Therefore, computing the signature of the null block each time the null block has to be removed is disadvantageous in terms of memory and computing resource consumption.

An Example of Eliminating Null Blocks in a Backup Image

FIG. 1 is a block diagram of a computing system. This system includes computing device 10 and storage device 130. As shown, computing device 10 and storage device 130 are coupled by network 140. Computing device 10 can be any of a variety of different types of computing devices, including computing devices such as a server, personal computing device, laptop computer, net book, personal digital assistant, cellular phone, or the like.

Computing device 10 includes processor 20 and memory 30. Memory 30 can be used to execute (or run) application 40. For example, application 40 can be a database application (e.g., a database management system (DBMS) or other application). As shown in FIG. 1, application 40 creates pre-allocated file 50 (e.g., a pre-allocated data file that is created when a new database is created by application 40). Pre-allocated file 50 includes live blocks 60(1)-(N) as well as null blocks 70(1)-(N). Pre-allocated file 50 is associated with a backup module 80 as well as a metadata module 90. Metadata module 90 further includes a map file 110.

Computing device 10 is coupled to storage device 130 via network 140. Storage device 130 can be a persistent or non-persistent storage device. Storage device 130 can include one or more of a variety of different storage devices, including hard disks, compact discs, digital versatile discs, solid state drive (SSD) memory such as Flash memory, and the like, or one or more logical storage devices such as volumes (e.g., virtual disks) implemented on one or more such physical storage devices. Storage device 130 can provide persistent storage because data stored on storage device 130 can be maintained (e.g., for a non-negligible time, such as several minutes, hours, days, weeks, etc.) even if power to storage device 130 and/or to a drive that reads and writes to storage device 130 is interrupted or cycled off for a non-negligible time.

Computing device 10 and storage device 130 can be integrated (e.g., where the storage device is coupled to the computing device's internal processing devices by an internal bus and is built within the same chassis as the rest of the computing device) or separate. If separate, computing device 10 and storage device 130 can be coupled by a local connection (e.g., using a technology such as Bluetooth™, Peripheral Component Interconnect (PCI), Small Computer System Interface (SCSI), or the like), or (as shown in this example) via one or more networks 140 such as the Internet or a storage area network (SAN).

In this example, computing device 10 implements application 40 which, as noted, can be a database application that creates pre-allocated file 50. For example, application 40 can use a file system structure (not shown) which can control access to pre-allocated 50 (and other files) used by application 40 (stored temporarily in memory 30 as well as more permanently in storage device 130). Computing device 10 also implements backup module 80 which further accesses a backup application that can perform a backup operation. Similarly, computing device 10 also implements metadata module 90 which can collect and store metadata (e.g., in map file 110) about one or more pre-allocated files and the contents of pre-allocated files.

Pre-allocated file 50 includes both live blocks 60(1)-(N) (e.g., units of storage that contain data) and null blocks 70(1)-(N) (e.g., units of storage that do not (yet) contain any data). As noted above, pre-allocated file 50 can be created by application 40 when a new database is created. Also as noted above, pre-allocated file 50 can include a significant number of units of storage that are null (e.g., unused or empty) and contain no data (e.g., null blocks 70(1)-(N)). Backup module 80 and metadata module 90 can inhibit (or prevent) the writing of null blocks 70(1)-(N) to storage device 130 during a backup operation.

It should be noted that each block (e.g., live block 60(1), null block 70(1), etc.) is a unit of storage (or a unit of data).

In some embodiments, blocks are fixed-size units of storage that represent the smallest granularity of data storage that can be manipulated by application 40, storage device 130, and/or operating system. In other embodiments, blocks can be variably-sized, can represent a larger granularity than the smallest representable by application 40, and/or have other, different characteristics than specified here. In addition, it should be noted that data can be stored in pre-allocated file 50 in another form and/or unit of storage other than a block.

In one embodiment, backup module 80 accesses a backup application (e.g., backup application 85) which performs a backup operation of pre-allocated file 50 and other pre-allocated files (not shown). It should be noted that application 40 can create more than one pre-allocated file 50. Prior to performing the backup operation, backup module 80 identifies one or more null units of storage (e.g., null blocks 70(1)-(N)). The backup operation then produces a backup image 120 which includes a backup file 55. Backup file 55 corresponds to and is associated with pre-allocated file 50. Each pre-allocated file can be backed up to a corresponding backup file in backup image 120 as a result of the backup operation executed by backup application 85 and implemented by backup module 80.

In another embodiment, backup module 80, having identified null blocks 70(1)-(N), inhibits (or prevents) the writing of null blocks 70(1)-(N) to backup image 120. Instead, backup module 80 permits the backup operation to only write live blocks 60(1)-(N) to backup image 120 (live blocks 60(1)-(N) are shown as corresponding backup blocks 65(1)-(N) in backup image 120). However, during the backup operation, metadata module 90 collects metadata related to null blocks 70(1)-(N) and creates a map file 110, which is also written to backup image 120 during the backup operation (along with live blocks 60(1)-(N)). The example contents of null blocks 70(1)-(N), map file 110, and backup image 120 are discussed in greater detail in association with FIGS. 3, 4, and 5.

Figure 2:
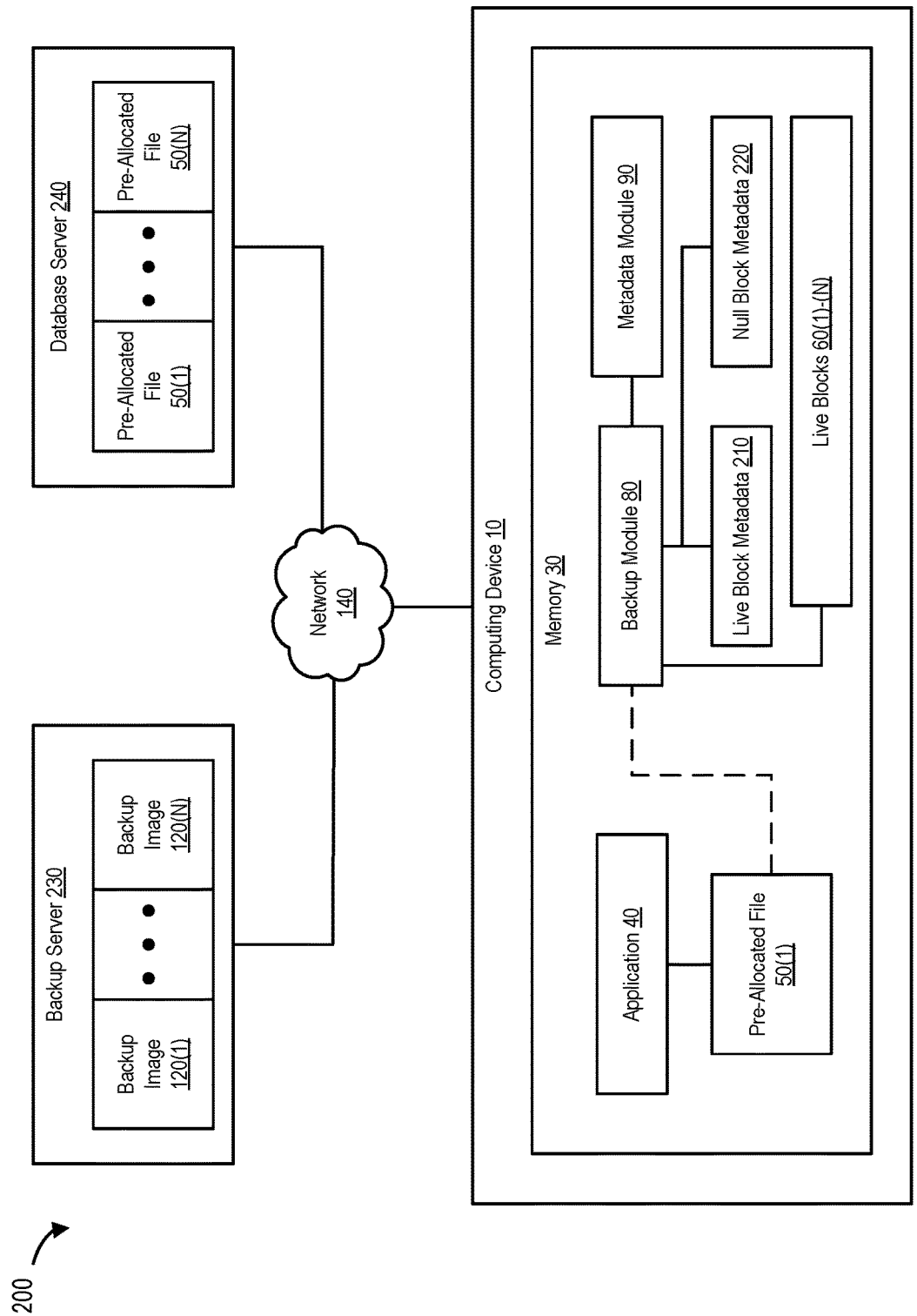
FIG. 2 is a block diagram of a computing system that inhibits the writing of null units of storage to a backup image during a backup operation, according to one embodiment of the present invention.

FIG. 2 is a block diagram of a computing system which can implement backup module 80 and metadata module 90. As shown in FIG. 2, computing device 10 includes memory 30 which implements application 40, backup module 80, and metadata module 90. In one embodiment, metadata module 90 extracts live block metadata 210 and null block metadata 220 from pre-allocated file 50(1). Backup module 80 permits a backup operation to only write live blocks 60(1)-(N), and the metadata extracted by metadata module 90 (e.g., live block metadata 210 and null block metadata 220) to a backup image. It should be noted that, in certain embodiments, map file 110 includes only null block metadata 220, or alternatively, both null block metadata 220 and live block metadata 210. If map file 110 only includes null block metadata 220, metadata module 90 can store live block metadata 210 in another (or separate) map file, or together with live blocks 60(1)-(N).

As shown in FIG. 2, backup images 120(1)-(N) are stored on backup server 230. In addition to backup images 120(1)-(N), backup server can also store a map file 110 (that stores both null block metadata 220 and live block metadata 210), or two (or more) map files (that separate store null block metadata 220 and live block metadata 210). Although application 40 can create a pre-allocated file in memory 30 of computing device 10, pre-allocated files (e.g., pre-allocated files 50(1)-(N)) can also be created and stored in a database server 240 (as shown in FIG. 2), and can be copied to memory 30 prior to (or during) the performance of a backup operation. In addition, as shown, computing device 10, backup server 230, and database server 240 can be coupled to each other via one or more networks (e.g., network 140).

Example Contents of a Null Block, a Map File, and a Backup Image

Figure 3:
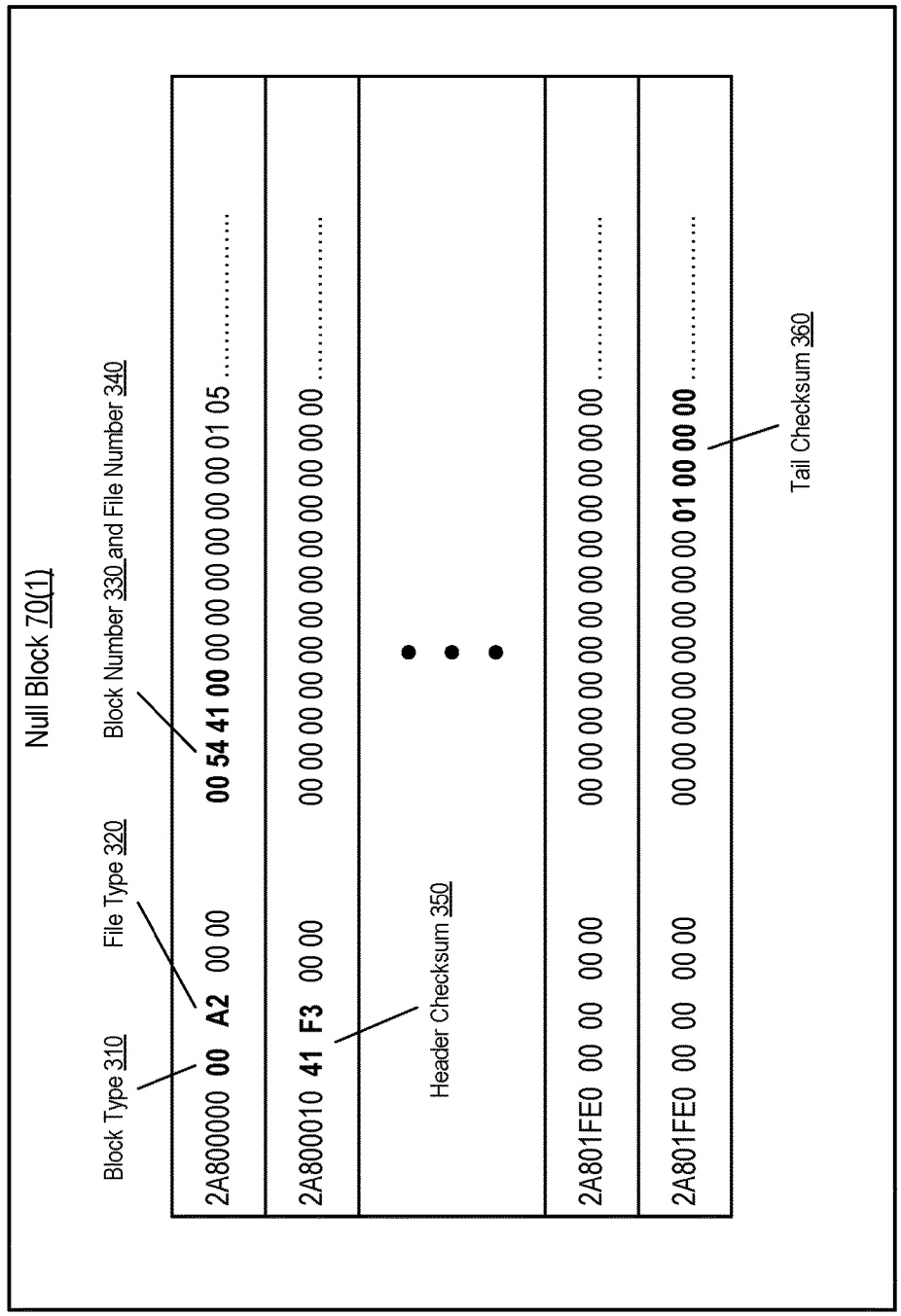
FIG. 3 is a block diagram that illustrates the content of a null unit of storage, according to one embodiment of the present invention.

FIG. 3 illustrates an example null block and the contents of the example null block. Although a null block does not contain any live data, a null block includes a header and a tail. As shown in FIG. 3, the header of null block 70(1) includes a block type 310 which is information (e.g., in the form of metadata 00) that identifies the type of the block as a null block. Thus, null block 70(1) can be identified as a null block by way of block type 310, by the content of null block 70(1), or by both. The header also includes a file type 320 (e.g., A2) which identifies the type of file null block 70(1) is part of (e.g., a pre-allocated data file, etc.). The header of example null block 70(1) also includes a block number 330, a file number 340, and a header checksum 350. Similarly, the tail of example null block 70(1) includes a tail checksum 360.

In one embodiment, information in the form of metadata regarding block type 310, file type 320, block number 330, file number 340, header checksum 350, and tail checksum 360 is extracted by metadata module 90 from pre-allocated file 50 and is populated into map file 110. Although null block 70(1) itself is prevented from being written to backup image 120 during a backup operation (e.g., by backup module 80), this null block metadata 220 contained in map file 110 is written to backup image 120 during the backup operation.

FIG. 4 illustrates the example contents of map file 110. Map file 110, which includes null block metadata 220 (and in some embodiments, live block metadata 210), and is written to backup image 120 during a backup operation includes at least the following information (e.g., in the form of metadata) for each null block identified by backup module 80 (e.g., null blocks 70(1)-(N)): block type 310, file type 320, header checksum 350, tail checksum 360, and offset 410. For example, for null block 70(1), map file 110 includes a block type of 0, a file type of A2, a header checksum of 41 F3, a tail checksum of 01 00 00 00, and an offset of 0-4 kilobytes (k). In some embodiments, the metadata in map file 110 is extracted from null blocks 70(1)-(N) by metadata module 90 and is populated to map file 110 during performance of a backup operation executed by backup module 80. In this example, although backup module 80 permits the writing of map file 110 and live blocks 60(1)-(N) to backup image 120, backup module 80 inhibits (or prevents) the writing of null blocks 70(1)-(N) to backup image 120.

FIG. 5 illustrates the example contents of backup image 120. After performance of the backup operation, backup image 120 includes backup files 55(1)-(N), and corresponding map files 110(1)-(N). As noted above, backup files 55(1)-(N) correspond to pre-allocated files 50(1)-(N). However, unlike pre-allocated files 50(1)-(N) which include live blocks 60(1)-(N) and null blocks 70(1)-(N), backup files 55(1)-(N) (as shown in FIGS. 1 and 5) only include live blocks 60(1)-(N) and map files 110(1)-(N) (e.g., with null block metadata 220 and live block metadata 210). Null blocks 70(1)-(N) are prevented from being written to backup image 120 during the backup operation (e.g., by backup module 80 in conjunction with metadata module 90). In some embodiments, metadata module 90 extracts null block metadata 220 from null blocks 70(1)-(N) and live block metadata 210 from live blocks 60(1)-(N). However, backup module 80 only writes null block metadata 220 to backup image 120 (in addition to live block metadata 210 and live blocks 60(1)-(N)). In other embodiments, multiple backup files (e.g., backup files 55(1)-(N)) can be stored on a single backup image (e.g., backup image 120).

An Example of Backing Up a Pre-Allocated File

Figure 6A:
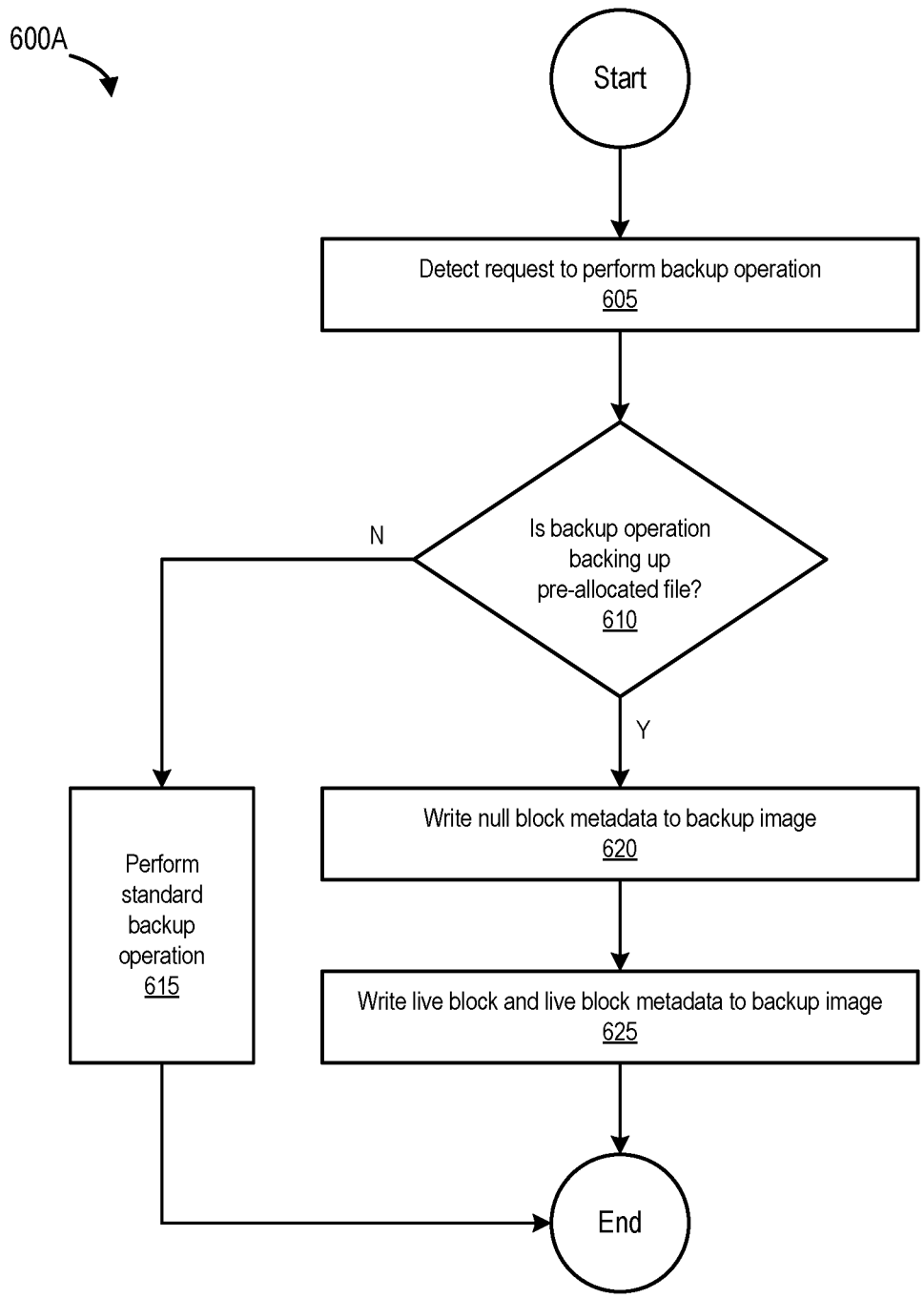
FIG. 6A is a flowchart that illustrates a process for performing a backup operation, according to one embodiment of the present invention.

FIG. 6A is a flowchart that illustrates a process for performing a backup operation. The process begins at 605 by detecting a request to perform a backup operation. For example, the request can be provided a user of computing device 10, a system and/or database administrator, or the request can be received by backup module 80 based on a predetermined backup schedule. At 610, the process determines if the backup operation seeks to back up a pre-allocated file (e.g., pre-allocated file 50). If the process determines that the backup operation does not seek to backup a pre-allocated file (e.g., any other file that is not a pre-allocated file), the process ends at 615 by performing a standard backup operation. However, if the process determines that the backup operation is backing up a pre-allocated file, the process, at 620, writes null block metadata to the backup image (e.g., backup image 120). The process ends at 625 by writing both live blocks (e.g., live blocks 60(1)-(N)) and live block metadata (e.g., live block metadata 210) to the backup image.

In one embodiment, backup module 80 selects a unit of storage (e.g., from a pre-allocated file) and determines if the unit of storage contains null data or live data. If the unit of storage contains null data, backup module 80 writes only null data information (e.g., null block metadata 220) to a backup image and inhibits (e.g., prevents or blocks) the writing of the null data (e.g., null blocks 70(1)-(N)) to the backup image (e.g., backup image 120), for example, by a backup software. However, if backup module 80 determines that the unit of storage contains live data, backup module 80 permits the backup software to write the live data (e.g., live blocks 60(1)-(N) depicted as backup blocks 65(1)-(N) in backup image 120) as well as live data unit of storage information (e.g., live block metadata 210) to the backup image.

Figure 6B:
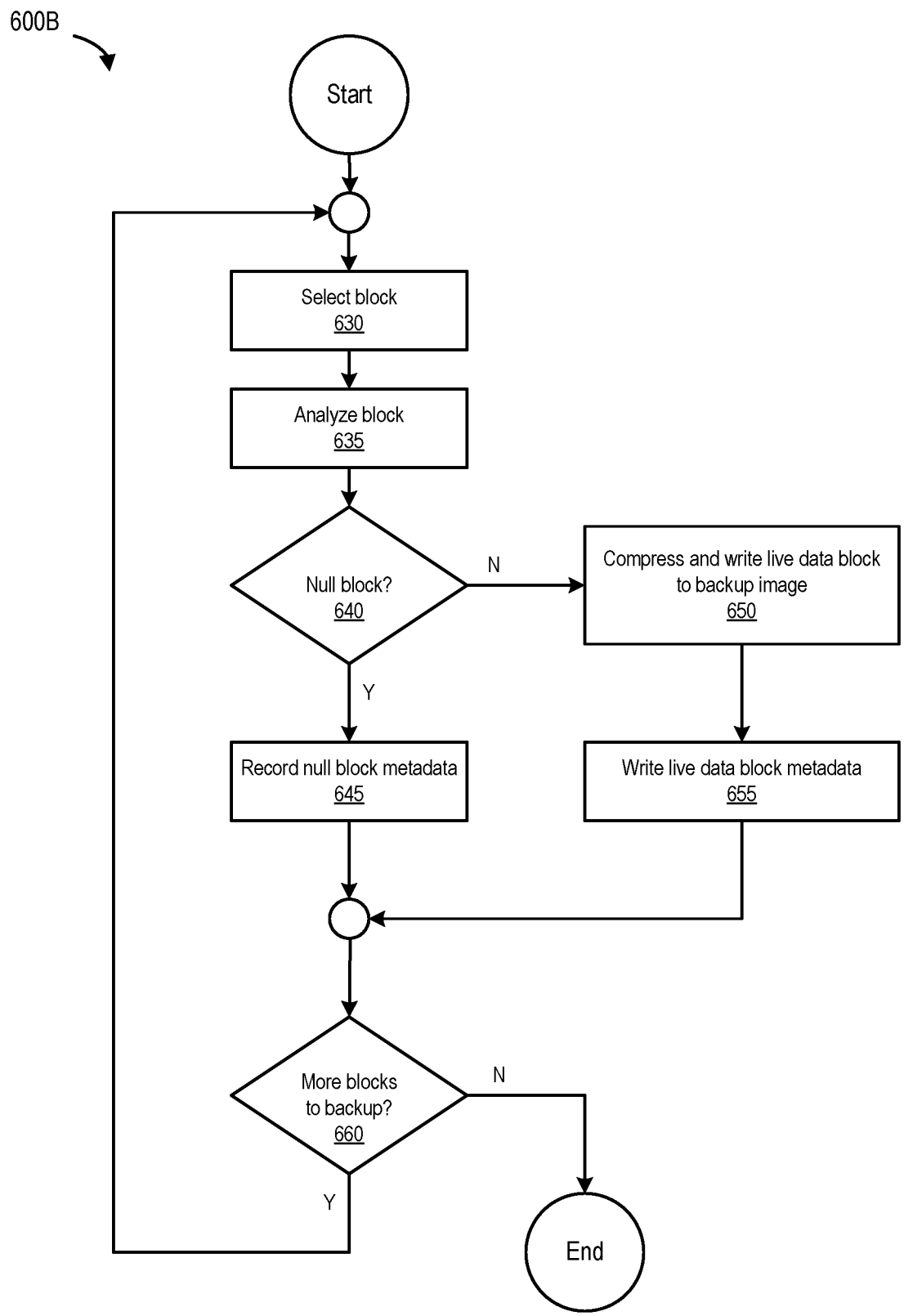
FIG. 6B is a flowchart that illustrates a process for inhibiting the writing of null units of storage to a backup image during a backup operation, according to one embodiment of the present invention.

FIG. 6B illustrates a process for recording null block metadata and writing only live units of storage to a backup image. The process begins at 630 by selecting a block (e.g., a unit of storage). At 635, the process analyzes (or parses) the block (e.g., using backup module 80). At 640, the process determines if the block is a null block. As noted above, a null block in a pre-allocated file includes a header that includes metadata that identifies the block as a null block. For example, metadata module 90 can access a block's header to determine whether the block is a null block or a live block (e.g., by noting that block type 0 of null blocks 70(1)-(N) as illustrated in FIG. 4 indicates that the block is a null block). If the block is a null block, the process, at 645, records null block metadata (e.g., writes null block metadata 220 to map file 110). In some embodiments, this recordation can be performed during an ongoing full, incremental, or synthetic backup operation.

However, if the block is not a null block (e.g., it is block that contains live data), the process, at 650, compresses and writes the live data block to the backup image (e.g., backup image 120). At 655, the process writes live data block metadata (e.g., live block metadata 210), for example, to map file 110, to a separate map file (not shown in FIG. 1) stored on computing device 10 or on backup image 120), to a metadata catalog stored on another storage device or computing device, or on a server (e.g., backup server 230 or database server 240). The process ends at 660 by determining if there are more blocks (e.g., other units of storage) to backup. If there are more blocks to be backed up, the process starts again at 630, by selecting a block or unit of storage. If not, the process ends (e.g., after the backup operation has been completed). As noted, only null block metadata is recorded. The null blocks are not written to the backup image.

Creating a Map File

Figure 6C:
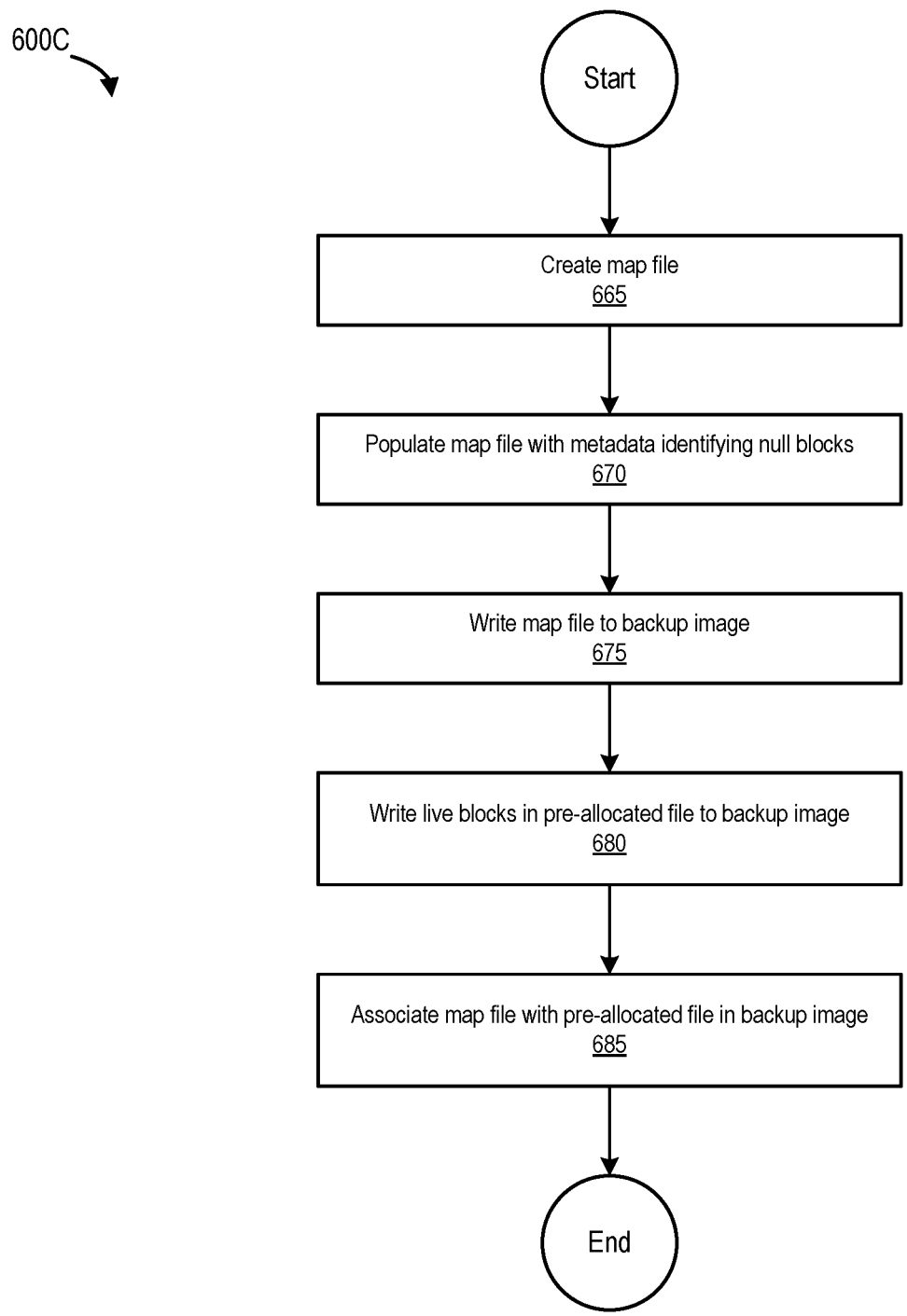
FIG. 6C is a flowchart that illustrates a process for creating a map file, according to one embodiment of the present invention.

FIG. 6C illustrates a process for creating a map file. The process begins at 665 by creating a map file (e.g., in memory 30 of computing device 10 as shown in FIG. 1). The map file defines one or more relationships between live data and null data and particularly, between live units of storage and null units of storage. In addition, as shown in FIG. 4, the map file also stores metadata identifying, for each null block (or live block for that matter): a block type, a file type, a header checksum, a tail checksum, and an offset of the unit of storage or block. Therefore, backup module 80 can use the map file (e.g., map file 110) to inhibit writing of one or more identified null units of storage (e.g., null blocks 70(1)-(N)) to a backup image (e.g., backup image 120) based on metadata (e.g., null block metadata 220) contained in the map file. In this example, map file 110 is created by metadata module 90.

In one embodiment, the map file is created before a backup operation is allowed to commence. In other embodiments, the map file is created as the first step in a backup operation. In this example, the map file is created in memory 30 of computing device 10 as shown in FIG. 1. At 670, the process populates the map file with metadata identifying null blocks (e.g., using metadata module 90). At 675, the process writes the map file to a backup image (e.g., as part of a backup operation) by copying map file 110 from memory 30 of computing device 10 to backup image 120 on storage device 130. In some embodiments, the process may or may not maintain the map file in the memory of the computing device after it has been written (or copied) over to the backup image. For example, the process may delete the map file from the memory of the computing device after the backup operation has ended.

At 680, the process writes live blocks in the pre-allocated file to the backup image. Preferably, though not strictly, the process writes only live blocks from the pre-allocated file to the backup image, though alternatives exist in which not all such live data are written, or other information (null data, other metadata, or other such information) may be written, instead or as well. As part of writing the live blocks, the process may write live block metadata 210 to the backup image, but the process inhibits the backup software from writing null blocks or null data in the pre-allocated file to the backup image. As noted above, and according to one embodiment, the process may permit the backup software to write null block metadata 220 to map file 110 as part of the backup operation. The process ends at 685 by associating the map file with the pre-allocated file in the backup image. For example, and as shown in FIG. 1, map file 110 is associated with pre-allocated file 50 in backup image 120 (in FIG. 1, the backed up copy of pre-allocated file 50 is named backup file 55 and the written live blocks 60(1)-(N) are named backup blocks 65(1)-(N) to indicate the foregoing association).

An Example of a Restoring a Pre-Allocated File

Figure 7A:
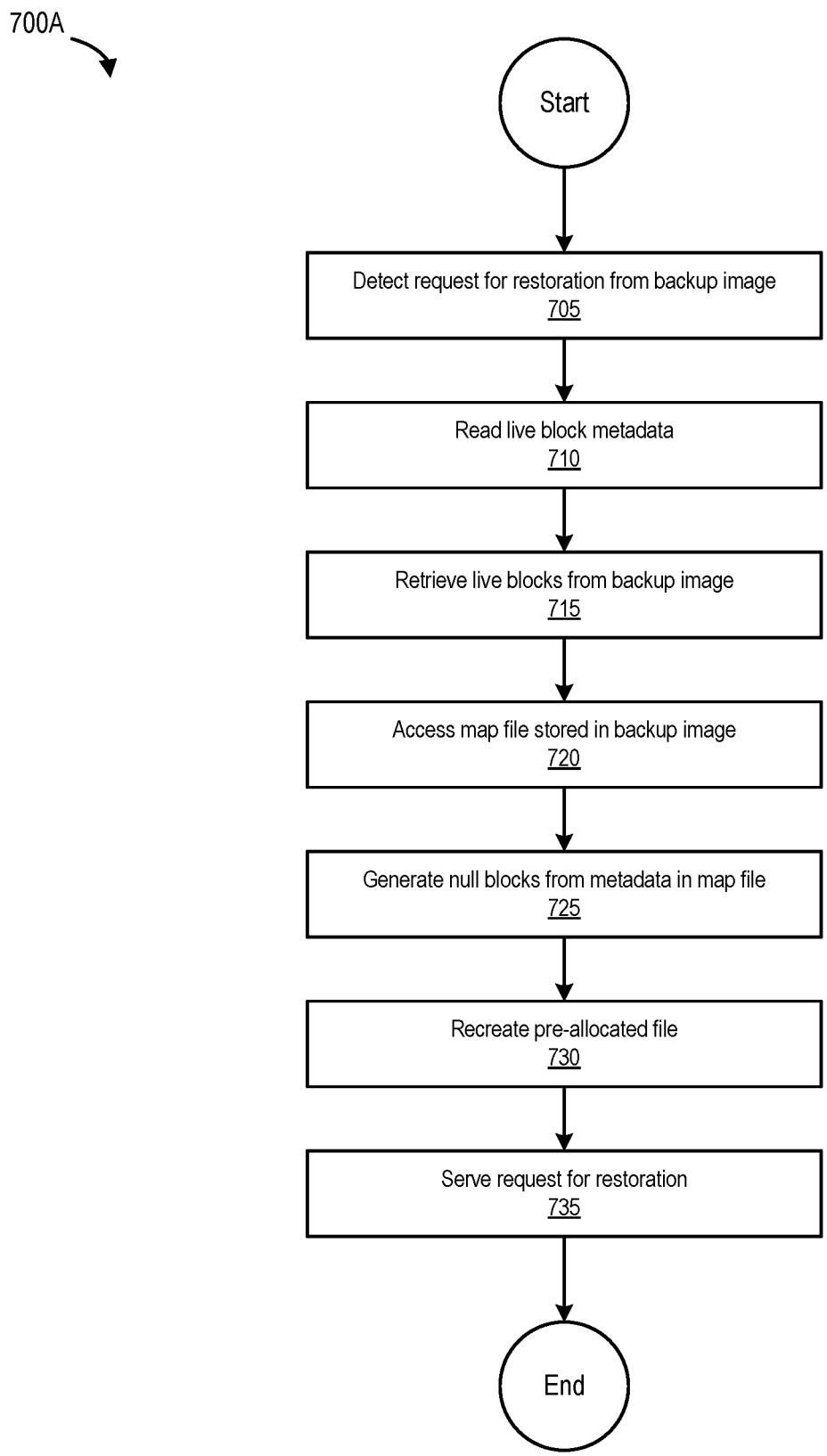
FIG. 7A is a flowchart that illustrates a restore operation, according to one embodiment of the present invention.

FIG. 7A illustrates a process for restoring a pre-allocated file from a backup image. The process begins at 710 by reading live block metadata. In this example, live block metadata 210 is stored in backup image 120 as a part of map file 110. At 715, the process retrieves the live blocks from the backup image (e.g., backup blocks 65(1)-(N) as shown in FIG. 1). At 720, the process access the map file stored in the backup image. At 725, the process generates null blocks from metadata in the map file. For example, the process accesses metadata relating to null blocks 70(1)-(N) stored in map file 110 (as shown in FIG. 4) and generates null blocks 70(1)-(N) by associating null block metadata 220 with the null blocks in pre-allocated file 50 that were not written to (or were inhibited and/or prevented from being written to) the backup image as part of the backup operation (e.g., null blocks 70(1)-(N)).

At 730, the process recreates the pre-allocated file based on the retrieved live blocks and the generated null blocks. In one embodiment, the restored pre-allocated file is created by combining or merging the retrieved live units of storage from the backup image backup blocks (e.g., backup blocks 65(1)-(N)), and the generated null units of storage (e.g., generated from the metadata in map file 110). The process ends at 735 by serving a request for restoring the pre-allocated file (e.g., to a user of computing device 10).

Figure 7B:
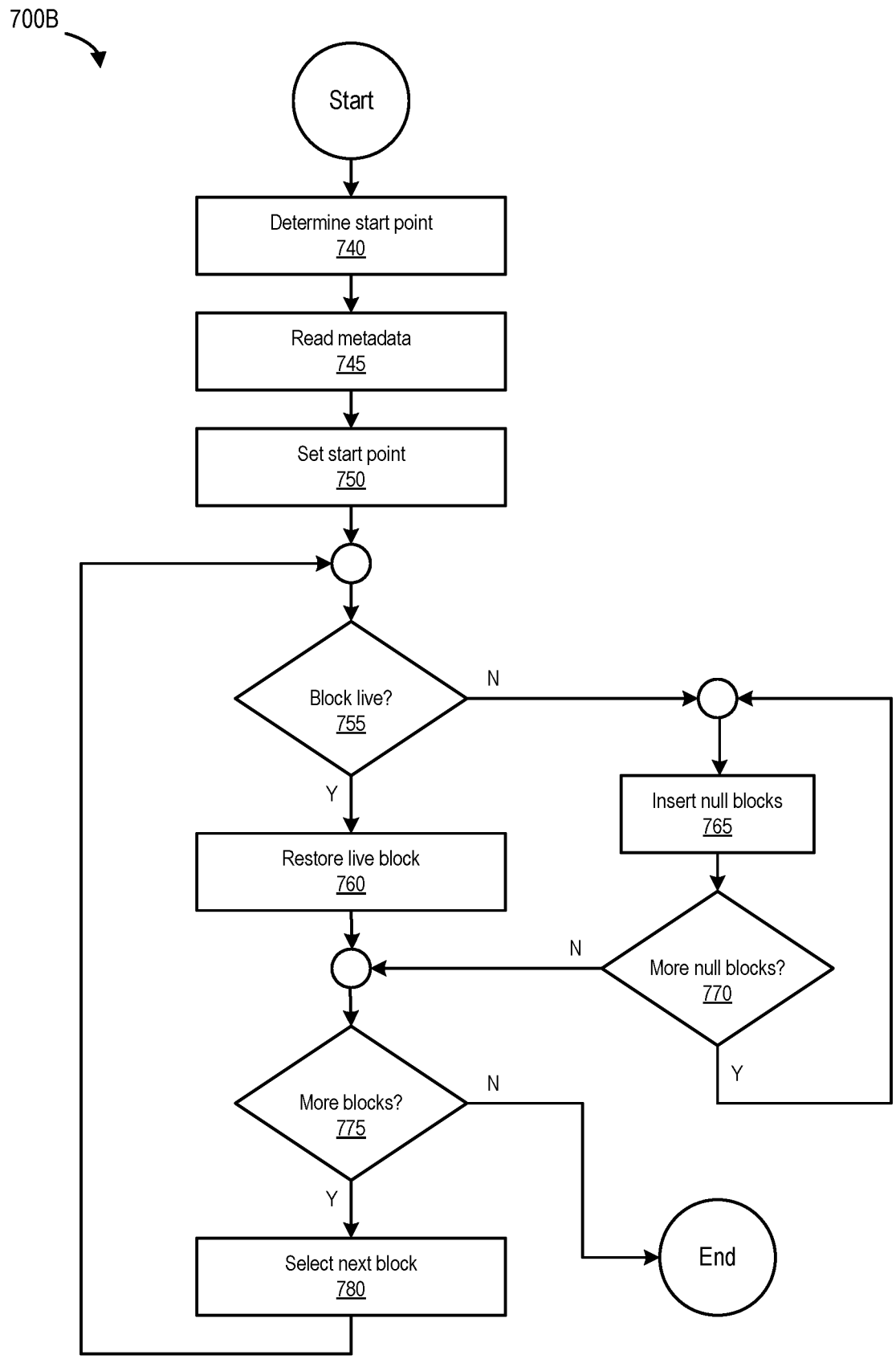
FIG. 7B is a flowchart that illustrates a process for generating null blocks during a restore operation, according to one embodiment of the present invention.

FIG. 7B illustrates a process for generating null blocks, for example, as part of a restore operation. The process begins at 740 by determining a start point for the restore operation. For example, the start point can be based on offset 410 (as shown in FIG. 4) and can indicate the location where a particular null block should start and stop within the pre-allocated file (to be restored). In some embodiments, the block size of the null block can be fixed (e.g., the default size of the unit of storage can be 4 k or 8 k and can be set by a database application). In other embodiments, a user can determine the size of the null block. Given that a null block may take up at least 4 k or 8 k worth of storage space if written to a backup image as part of a backup operation, it will be appreciated that inhibiting the writing of null blocks in a pre-allocated file to the backup image can save considerable storage resources (e.g., the null block metadata in the header and the tail of the null block typically only takes up a few bytes of storage space; thus the storage space utilized by the map file is nominal).

At 745, the process reads metadata (e.g., live block metadata 210 and/or null block metadata 220). At 750, the process sets a start point (e.g., a location within the pre-allocated file from which the restore operation should start). At 755, the process determines if the block is live. If the unit of storage is live data, the process, at 760, restores the live block. In one embodiment, the map file only stores metadata about live data in the pre-allocated file. For example, map file 110 can include only the offsets for units of storage which contain live data. In this example, the restore process will assume that any missing offset is an offset that contains null units of storage. In another embodiment, map file 110 can include only the offsets for units of storage which contain null data. In this alternate example, the restore process will assume that any missing offset is an offset that contains live units of storage. In some embodiments, the map file can of course include metadata regarding both live units of storage and null units of storage.

If the block is not a live block, the process, at 765, inserts null blocks into the offset (or offset range) indicated by that block's metadata. For example, offset 0 k-4 k as shown in FIG. 4 indicates a null block. Accordingly, a null block is inserted into offset 0 k-4 k in the restored pre-allocated file (if the start point is set at that particular offset (0 k)). However, and according to an alternate example, the restore process can also read map file 110 and assume that because offset 4 k-8 k (also as shown in FIG. 4) does not have any indication (or information) of the type of block that resides at that offset, that the type of block at that particular offset must be a live unit of storage. Accordingly, the restore process (or software) can restore the unit of storage at offset 4 k-8 k based on the determination that the offset contains live data (e.g., backup block 65(1) can be restored as live block 60(1) in the restored pre-allocated file).

At 770, the process determines if there are more null blocks (e.g., the process determines if there are any more offsets in map file 110 that need to be read and/or parsed to analyze whether the offset contains a null unit of storage). If there are more null blocks, the process continues to insert the null blocks. At 775, the process determines if there are more blocks (e.g., in map file 110). If there are more blocks (to restore), the process, at 780, selects the next block and determines if the selected unit of storage is a live unit of storage. If there are no more blocks to restore, the process ends.

An Example of Minimizing Consumption of Storage, Memory and Computing Resources

As noted above, by inhibiting the writing of null blocks in a pre-allocated file to a backup image, a backup operation can conserve valuable memory and computing resources. It should be noted that because null blocks do contain metadata in their header and tail sections (e.g., a relative data block address, among other pieces of information), the null blocks appear as new blocks (or live blocks) to deduplication software. Therefore, deduplication software may not be able to deduplicate null blocks because null blocks in pre-allocated files have a valid header and a tail (which also consumes storage resources if written to a backup image).

In addition, provisioning multiple instances of a database from a single backup image (e.g., as provided by copy data management methodologies) results in substantial disk input/output (I/O) costs because multiple instances of the database can needlessly (and redundantly) access the null blocks from the backup image, if those null blocks are written to the backup image. Therefore, in addition to consuming valuable storage resources (also as noted above in association with null block compression), writing null blocks in a pre-allocated file to a backup image also expends significant memory and disk I/O resources (e.g., when one or more instances of a database are implemented using copy data management).

Therefore, it will be appreciated that in addition to other appreciable benefits, inhibiting the writing of null blocks in a pre-allocated file to a backup image during a backup operation may be advantageous to preserving storage, memory, and computing resources.

An Example Computing Environment

Figure 8:
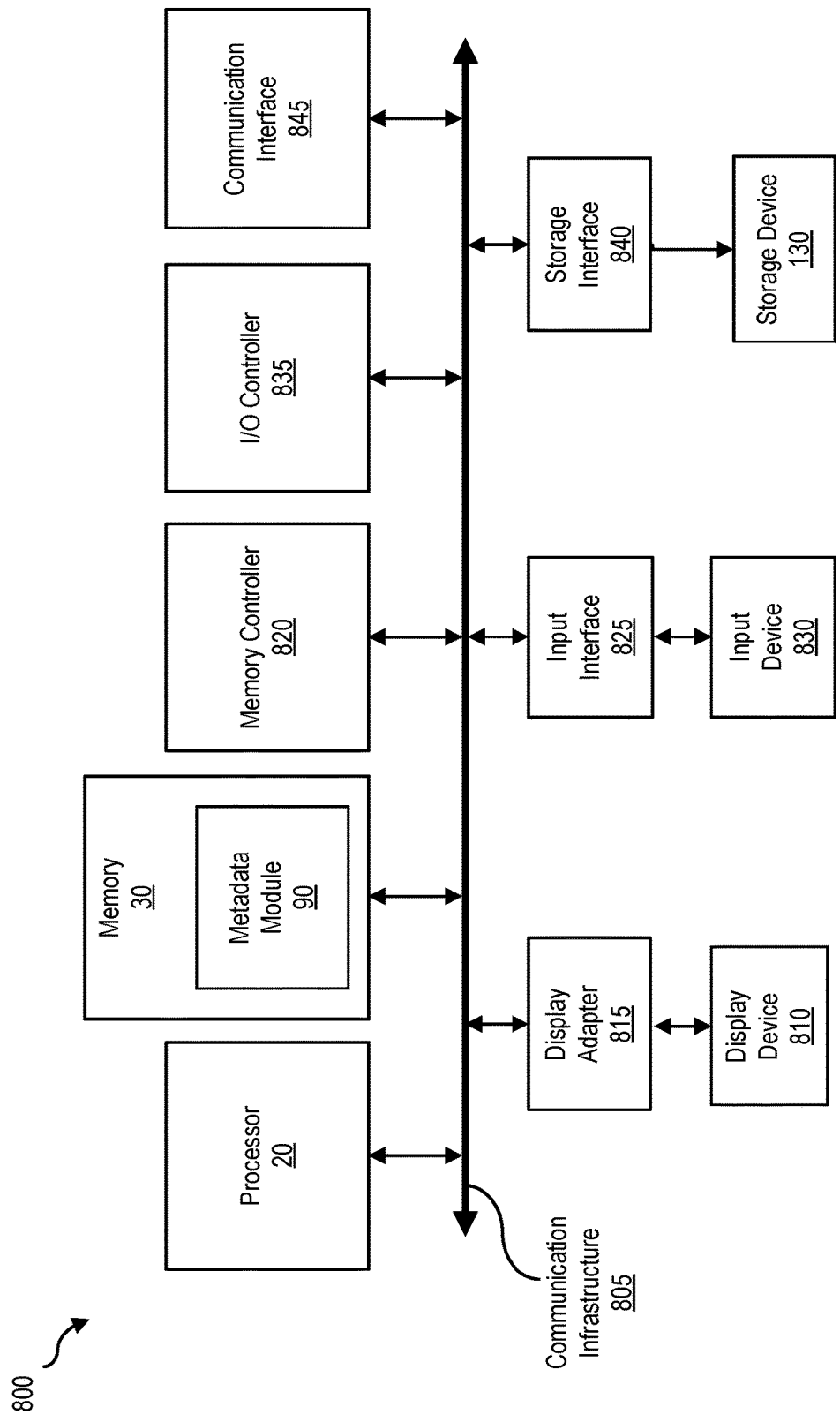
FIG. 8 is a block diagram is a computing device, illustrating how a metadata module can be implemented in software, according to one embodiment of the present invention.

FIG. 8 is a block diagram of a computing system 800 capable of implementing computing device 10 as described above. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 20 and a memory 30. By executing the software that implements computing device 10, computing system 800 becomes a special purpose computing device that is configured to optimize the storage of pre-allocated units of storage during a data backup operation.

Processor 20 generally represents any type or form of processing unit capable of processing data or interpreting and executing instructions. In certain embodiments, processor 20 may receive instructions from a software application or module. These instructions may cause processor 20 to perform the functions of one or more of the embodiments described and/or illustrated herein. For example, processor 20 may perform and/or be a means for performing all or some of the operations described herein. Processor 20 may also perform and/or be a means for performing any other operations, methods, or processes described and/or illustrated herein.

Memory 30 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a modifiable volume snapshot operation may be loaded into memory 30.

In certain embodiments, computing system 800 may also include one or more components or elements in addition to processor 20 and memory 30. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 20, memory 30, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 20, memory 30, communication interface 845, display adapter 815, input interface 825, and storage interface 840.

Communication interface 845 broadly represents any type or form of communication device or adapter capable of facilitating communication between computing system 800 and one or more additional devices. For example, in certain embodiments communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. In at least one embodiment, communication interface 845 may provide a direct connection to a remote server via a direct link to a network, such as the Internet. Communication interface 845 may also indirectly provide such a connection through, for example, a local area network (such as an Ethernet network), a personal area network, a telephone or cable network, a cellular telephone connection, a satellite data connection, or any other suitable connection.

In certain embodiments, communication interface 845 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing. For example, communication interface 845 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG. 8, computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include storage device 130 to communication infrastructure 805 via a storage interface 840. Storage device 130 generally represents any type or form of storage devices or mediums capable of storing data and/or other computer-readable instructions. For example, storage device 130 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 130, and other components of computing system 800.

In certain embodiments, storage device 130 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 130 may also include other similar structures or devices for allowing computer software, data, or other computer-readable instructions to be loaded into computing system 800. For example, storage device 130 may be configured to read and write software, data, or other computer-readable information. Storage device 130 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 30 and/or various portions of storage device 130. When executed by processor 20, a computer program loaded into computing system 800 may cause processor 20 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
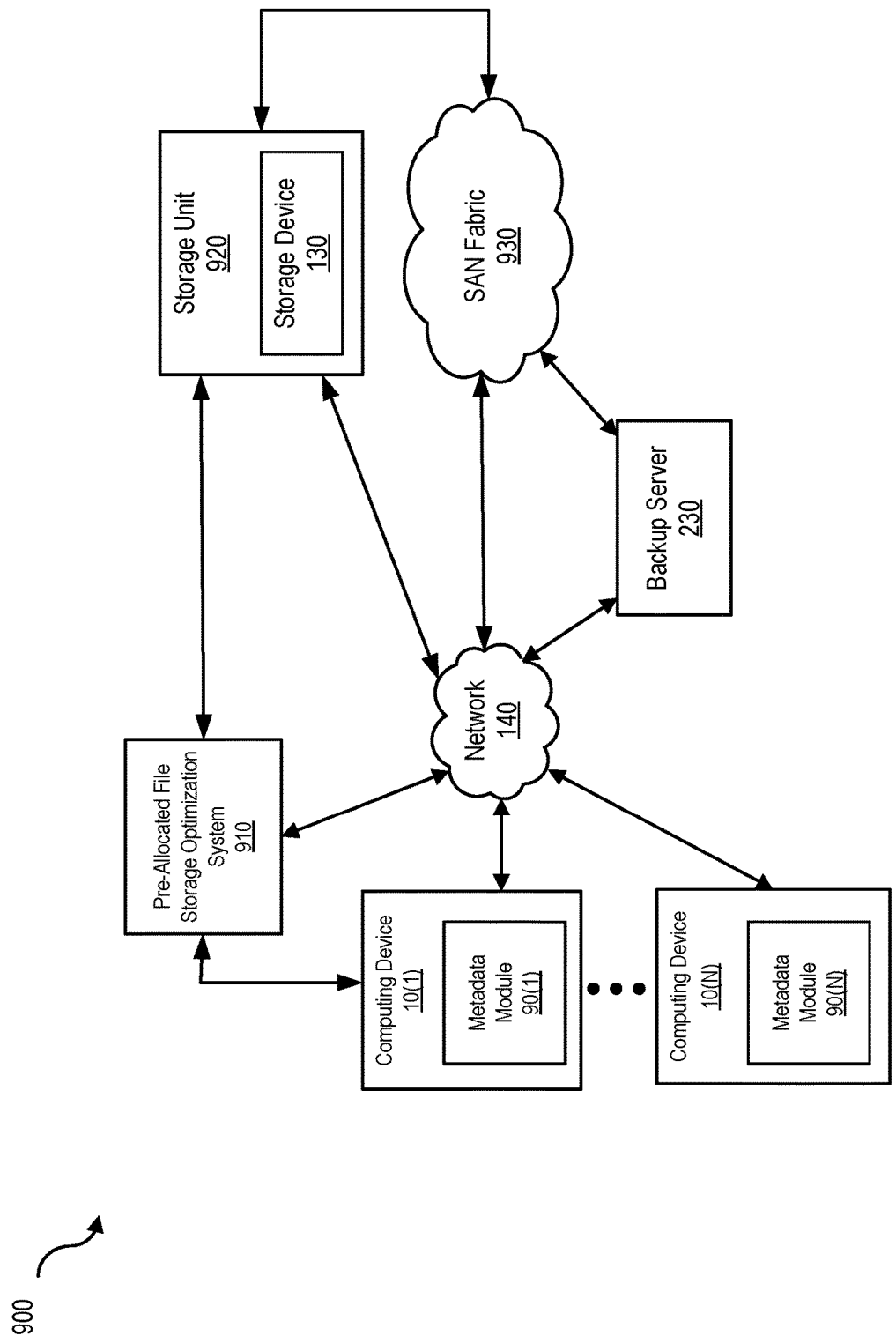
FIG. 9 is a block diagram of a networked system, illustrating how various computing devices can communicate via a network, according to one embodiment of the present invention.

FIG. 9 is a block diagram of a network architecture 900 in which computing device 10 may be coupled to network 140. In certain embodiments, network-attached storage (NAS) devices may be configured to communicate with computing device 10 using various protocols, such as Network File System (NFS), Server Message Block (SMB), or Common Internet File System (CIFS).

Network 140 generally represents any type or form of computer network or architecture capable of facilitating communication between multiple computing devices. Network 140 may facilitate communication between computing device 10, database server 240, and/or backup server 230. In certain embodiments, and with reference to computing system 800 of FIG. 8, a communication interface, such as communication interface 845 in FIG. 8, may be used to provide connectivity between computing device 10 and network 140. It should be noted that the embodiments described and/or illustrated herein are not limited to the Internet or any particular network-based environment. For example, network 140 can be a Storage Area Network (SAN).

In at least one embodiment, all or a portion of one or more of the embodiments disclosed herein may be encoded as a computer program and loaded onto and executed by computing device 10, database server 240, backup server 230, or any combination thereof. All or a portion of one or more of the embodiments disclosed herein may also be encoded as a computer program, stored in computing device 10, database server 240, or backup server 230, and distributed over network 140.

In some examples, all or a portion of the computing device in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, backup module 80 and/or metadata module 90 may transform behavior of a computing device in order to cause the computing device to optimize the storage of pre-allocated units of storage during a data backup operation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method, implemented in a computer system, comprising:
retrieving, by a processor of the computer system, a backup image from a storage device associated with the computer system, wherein
the backup image is for a pre-allocated data file,
the backup image comprises a map file and one or more live data blocks, and
the map file identifies one or more null units of storage of the pre-allocated data file at least by virtue of comprising metadata;
reading, by the processor, the metadata from the backup image, wherein
the metadata is associated with the one or more live data blocks by virtue of comprising live block metadata;
retrieving, by the processor, the one or more live data blocks from the backup image; and
restoring, by the processor, the pre-allocated data file to a restored data file, wherein
the restoring uses the metadata and the one or more live data blocks, and
the restoring comprises
generating, by the processor, one or more null data blocks, and
recreating, by the processor, the pre-allocated data file using the one or more live data blocks, the one or more null data blocks, and the metadata.

2. The method of claim 1, wherein
the metadata indicates whether a given block of the pre-allocated data file is a null data block or a live data block, and
the method further comprises
recreating the given block of the restored data file by writing a null data block of the one or more null data blocks or a live data block of the one or more live data blocks, as indicated by the metadata.

3. The method of claim 1, wherein
the map file comprises null block metadata that identifies the one or more null units of storage of the pre-allocated data file.

4. The method of claim 3, wherein the restoring further comprises:
accessing the map file, wherein
the map file was used in creating the backup image by inhibiting writing of the one or more null units of storage by virtue of identifying the one or more null units of storage.

5. The method of claim 4, further comprising:
detecting a restoration request, wherein
the restoration request is a request for restoration of the pre-allocated data file from the backup image.

6. The method of claim 5, further comprising:
serving the restoration request by providing the restored data file.

7. The method of claim 1, wherein
the one or more null data blocks are generated using the metadata.

8. The method of claim 1, wherein the recreating comprises:
reading at least a portion of the metadata;
determining whether a given block of the pre-allocated data file is a null data block or a live data block;
in response to the at least the portion of the metadata indicating that the given block was live data, restoring a live block of data from the one or more live data blocks into a position of the given block in the restored data file; and
in response to the at least the portion of the metadata indicating that the given block was not live data, inserting a null block into the position of the given block in the restored data file.

9. The method of claim 8, wherein the recreating further comprises:
determining a starting point, wherein
the starting point is defined as an offset in the pre-allocated data file,
the at least a portion of the metadata indicates the offset; and
setting the start point as the starting point for the recreating.

10. A computer system comprising:
one or more processors;
a non-transitory computer-readable storage medium coupled to the one or more processors; and
a plurality of instructions, encoded in the non-transitory computer-readable storage medium and configured to cause the one or more processors to
retrieve a backup image from a storage device associated with the computer system, wherein the backup image is for a pre-allocated data file,
the backup image comprises a map file and one or more live data blocks, and
the map file identifies one or more null units of storage of the pre-allocated data file at least by virtue of comprising metadata,
read metadata from the backup image, wherein
the metadata is associated with the one or more live data blocks by virtue of comprising live block metadata,
retrieve the one or more live data blocks from the backup image, and
restore the pre-allocated data file to a restored data file, wherein
the plurality of instructions configured to cause the one or more processors to restore uses the metadata and the one or more live data blocks, and
the plurality of instructions configured to cause the one or more processors to restore comprise instructions configured to cause the one or more processors to
generate one or more null data blocks, and
recreate the pre-allocated data file using the one or more live data blocks, the one or more null data blocks, and the metadata.

11. The computer system of claim 10, wherein the backup image is stored in the non-transitory computer-readable storage medium.

12. The computer system of claim 10, wherein the metadata indicates whether a given block of the pre-allocated data file is a null data block or a live data block, and
the plurality of instructions configured to cause the one or more processors to recreate is further configured to cause the one or more processors to
recreate the given block of the restored data file by writing a null data block of the one or more null data blocks or a live data block of the one or more live data blocks, as indicated by the metadata.

13. The computer system of claim 10, wherein the map file comprises null block metadata that identifies the one or more null units of storage of the pre-allocated data file.

14. The computer system of claim 13, wherein the plurality of instructions configured to cause the one or more processors to restore is further configured to cause the one or more processors to:
access the map file, wherein
the map file was used in creating the backup image by inhibiting writing of the one or more null units of storage by virtue of identifying the one or more null units of storage.

15. The computer system of claim 13, wherein the plurality of instructions configured to cause the one or more processors to recreate the pre-allocated data file is further configured to cause the one or more processors to:
read at least a portion of the metadata;
determine whether a given block of the pre-allocated data file is a null data block or a live data block;
in response to the at least the portion of the metadata indicating that the given block was live data, restore a live block of data from the one or more live data blocks into a position of the given block in the restored data file; and
in response to the at least the portion of the metadata indicating that the given block was not live data, insert a null block into the position of the given block in the restored data file.

16. A computer program product comprising:
a plurality of instructions, comprising
a first set of instructions, executable on a computer system, configured to retrieve a backup image from a storage device associated with the computer system, wherein
the backup image is for a pre-allocated data file,
the backup image comprises a map file and one or more live data blocks, and
the map file identifies one or more null units of storage of the pre-allocated data file at least by virtue of comprising metadata,
a second set of instructions, executable on the computer system, configured to read metadata from the backup image, wherein
the metadata is associated with the one or more live data blocks by virtue of comprising live block metadata,
a third set of instructions, executable on the computer system, configured to retrieve the one or more live data blocks from the backup image, and
a fourth set of instructions, executable on the computer system, configured to restore the pre-allocated data file to a restored data file, wherein
the fourth set of instructions uses the metadata and the one or more live data blocks, and
the fourth set of instructions comprise
a first subset of instructions, executable on the computer system, configured to generate one or more null data blocks, and
a second subset of instructions, executable on the computer system, configured to recreate the pre-allocated data file using the one or more live data blocks, the one or more null data blocks, and the metadata; and
a non-transitory computer-readable storage medium, wherein the instructions are encoded in the non-transitory computer-readable storage medium.

17. The computer program product of claim 16, wherein the metadata indicates whether a given block of the pre-allocated data file is a null data block or a live data block, and the second subset of instructions comprise:
a first sub-subset of instructions, executable on the computer system, configured to recreate the given block of the restored data file by writing a null data block of the one or more null data blocks or a live data block of the one or more live data blocks, as indicated by the metadata.

18. The computer program product of claim 16, wherein the map file comprises null block metadata that identifies the one or more null units of storage of the pre-allocated data file.

19. The computer program product of claim 18, wherein the fourth set of instructions comprises:
a first sub-subset of instructions, executable on the computer system, configured to access the map file, wherein
the map file was used in creating the backup image by inhibiting writing of the one or more null units of storage by virtue of identifying the one or more null units of storage.

20. The computer program product of claim 16, wherein the fourth set of instructions comprises:

a first subset of instructions, executable on the computer system, configured to reading at least a portion of the metadata;

a second subset of instructions, executable on the computer system, configured to determining whether a given block of the pre-allocated data file is a null data block or a live data block;

a third subset of instructions, executable on the computer system, configured to, in response to the at least the portion of the metadata indicating that the given block was live data, restoring a live block of data from the one or more live data blocks into a position of the given block in the restored data file; and a fourth subset of instructions, executable on the computer system, configured to, in response to the at least the portion of the metadata indicating that the given block was not live data, inserting a null block into the position of the given block in the restored data file.

* * * * *